(12) United States Patent
Tiedemann

(10) Patent No.: US 6,748,615 B1
(45) Date of Patent: Jun. 15, 2004

(54) NECK SUPPORTING PILLOW CONSTRUCTION

(76) Inventor: Bobbi-Jo Tiedemann, 13503-26 Street NW., Edmonton, Alberta (CA), T5A 3V9

(*) Notice: Subject to any disclaimer, the term of this patent is extended or adjusted under 35 U.S.C. 154(b) by 0 days.

(21) Appl. No.: 10/336,346

(22) Filed: Jan. 3, 2003

(51) Int. Cl.[7] ............................. A47G 9/00; A47C 7/38
(52) U.S. Cl. .................. 5/640; 5/636; 5/644; 297/397
(58) Field of Search .................. 5/636, 639, 640, 5/644, 645, 490, 630, 657; 297/220, 284.5, 397, 482

(56) References Cited

U.S. PATENT DOCUMENTS

| | | | |
|---|---|---|---|
| 2,307,331 A | * 1/1943 | Parker, Jr. ............... 297/284.5 |
| 3,195,953 A | * 7/1965 | Zacks ....................... 297/397 |
| 4,097,086 A | 6/1978 | Hudson .................... 297/217 |
| 4,114,948 A | 9/1978 | Perkey ...................... 297/397 |
| 4,471,993 A | * 9/1984 | Watson .................... 297/284.5 |
| 4,738,488 A | 4/1988 | Camelio .................. 297/393 |
| 4,773,106 A | * 9/1988 | Toso et al. ................ 5/657 |
| 4,796,315 A | * 1/1989 | Crew ........................ 5/630 |
| 4,862,536 A | * 9/1989 | Pruit ....................... 297/284.5 |
| 5,016,915 A | * 5/1991 | Perry ....................... 297/482 |
| 5,044,026 A | * 9/1991 | Matthews ................. 5/644 |
| 5,054,854 A | * 10/1991 | Pruit ....................... 297/284 |
| D338,587 S | 8/1993 | Harnish .................... D6/601 |
| 5,322,349 A | * 6/1994 | Gianino ................... 297/482 |
| 5,330,255 A | 7/1994 | Stawicki .................. 297/391 |
| 5,345,633 A | * 9/1994 | Harnish ................... 5/639 |
| 5,363,524 A | 11/1994 | Lang ........................ 5/640 |
| 5,375,278 A | 12/1994 | VanWinkle et al. ...... 5/644 |
| 5,503,456 A | 4/1996 | Rossini .................... 297/397 |
| 5,732,426 A | 3/1998 | Furuya et al. ............ 5/636 |
| 5,785,388 A | * 7/1998 | Curtis ...................... 297/482 |
| D396,594 S | 8/1998 | Lefebvre ................... D6/601 |
| 5,918,332 A | * 7/1999 | Dees ........................ 5/639 |
| 5,974,607 A | * 11/1999 | Smith ...................... 5/636 |
| 6,009,577 A | 1/2000 | Day ......................... 5/636 |
| 6,030,034 A | * 2/2000 | Plohetski ................. 297/188.06 |
| 6,086,158 A | * 7/2000 | Zeoli ....................... 297/482 |
| 6,202,236 B1 | * 3/2001 | Price ....................... 5/657 |
| D445,506 S | 7/2001 | Vinson et al. ............ D24/183 |
| 6,484,335 B2 | * 11/2002 | Gilbert .................... 5/636 |
| 6,527,339 B2 | * 3/2003 | Voris ....................... 397/219.12 |
| 6,557,307 B2 | * 5/2003 | Reddig .................... 52/36.1 |
| 2001/0022457 A1 | * 9/2001 | Voris ....................... 297/219.12 |
| 2001/0049844 A1 | * 12/2001 | Gilbert .................... 5/636 |
| 2003/0038521 A1 | * 2/2003 | Johnson ................... 297/397 |
| 2004/0003469 A1 | * 1/2004 | Gill-Barajas ............. 5/636 |

FOREIGN PATENT DOCUMENTS

| | | | |
|---|---|---|---|
| FR | 1417332 | * 10/1965 | ............ 297/397 |
| GB | 2194883 A | * 3/1988 | ............ 297/397 |

* cited by examiner

Primary Examiner—Robert G. Santos
(74) Attorney, Agent, or Firm—Sturm & Fix LLP

(57) ABSTRACT

A neck supporting cushion construction (10) including an elongated strap member (20) provided with a pair of cooperating fasteners (21) (22) wherein, the strap member (20) is dimensioned to be slidably received in a pair of opposed apertures (43) (43) formed in the rear portion of a pair of circular end panels (42) on a generally cylindrical fabric cover (40) dimensioned to receive a generally cylindrical sealed fabric envelope (31) containing a quantity of particulate material (32) such as buckwheat hulls or the like; wherein, the sealed fabric envelope (31) is introduced into the interior of the cover member (40) via an elongated zippered closure (44) hidden by a flap panel (45).

4 Claims, 1 Drawing Sheet

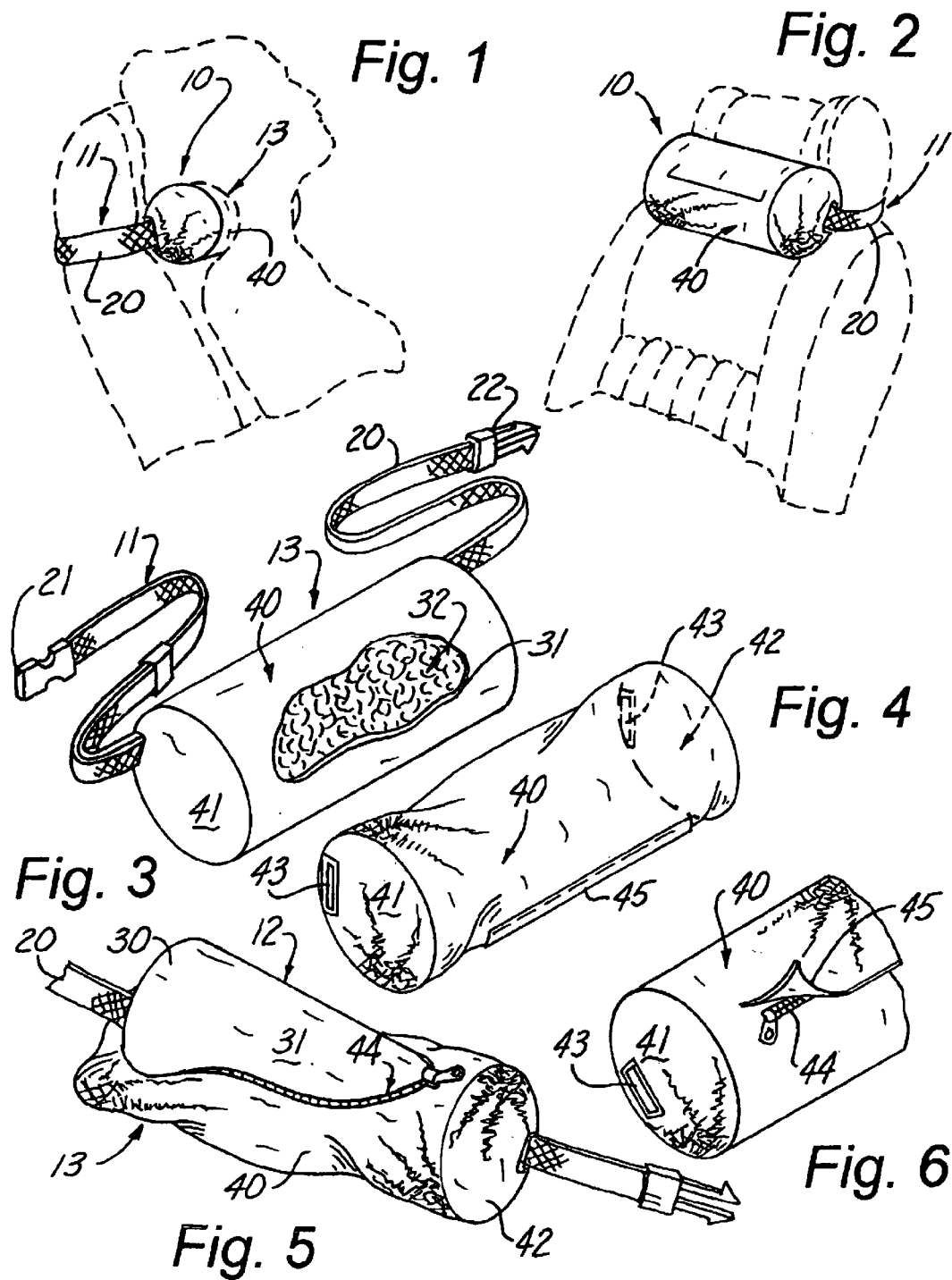

NECK SUPPORTING PILLOW CONSTRUCTION

CROSS REFERENCE TO RELATED APPLICATIONS

Not applicable.

BACKGROUND OF THE INVENTION

1. Field of the Invention

The present invention relates to the field of pillow construction in general and in particular to a neck supporting pillow construction having a novel pillow cover and securing arrangement.

2. Description of Related Art

As can be seen by reference to the following U.S. Pat. Nos. 5,503,456; D 445,506; 4,114,948; DES. 338,587; and, 5,330,255, the prior art is replete with myriad and diverse neck supporting pillow construction.

While all of the aforementioned prior art constructions are more than adequate for the basic purpose and function for which they have been specifically designed, they are uniformly deficient with respect to their failure to provide a simple, efficient, and practical pillow covering and slidable securing arrangement that allows the support surface of the pillow to be readily shifted relative to a vehicle head rest or the like. Unfortunately, virtually all of the aforementioned prior art constructions employ a pair of strap elements that are fixedly secured to the opposite ends of the pillow cover which requires the wholesale displacement of the entire assembly when the user wishes to adjust the position of the pillow member per se for a more compatible fit.

As a consequence of the foregoing situation, there has existed a longstanding need among users of this type of a device for a new and improved neck supporting pillow construction wherein the pillow member is laterally displaceable relative to the securing strap and which also employs a novel pillow member enclosure, and the provision of such a construction is the stated objective of the present invention.

BRIEF SUMMARY OF THE INVENTION

Briefly stated, the neck supporting pillow construction that forms the basis of the present invention comprises in general a securing unit, a pillow unit and a removable cover unit that cooperates with both the pillow unit and the securing unit in a unique manner.

As will be explained in greater detail further on in the specification, the securing unit comprises in general an elongated adjustable length strap member the opposite ends of which are provided with a pair of cooperating fasteners; and, the pillow unit comprises a pillow member including an elongated generally cylindrically shaped sealed fabric envelope filled with buckwheat hulls, foam beads or other suitable displaceable and/or deformable particulate material.

Of most importance, however, is the fact that the removable cover unit comprises an elongated cylindrical shaped fabric cover member having a pair of end panels provided with opposed openings which are dimensioned to slidably receive the elongated strap member and a hidden elongated zippered closure dimensioned to receive the pillow member; wherein, the zippered closure is further provided with a flap panel that conceals the zippered closure from view and prevents the zippered closure from coming into contact with the user's skin and/or hair.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the neck supporting pillow construction in use;

FIG. 2 is another perspective view of the pillow construction disposed around the headrest portion of a vehicle seat;

FIG. 3 is an isolated perspective view of the pillow construction with a portion of the cover unit and the pillow unit removed;

FIG. 4 is an isolated perspective view of the cover unit;

FIG. 5 is a detail view showing the pillow unit partially inserted into the cover unit;

FIG. 6 is a detail view of the hidden zippered closure arrangement.

DETAILED DESCRIPTION OF THE INVENTION

As can be seen by reference to the drawings, and in particular to FIG. 1, the neck supporting pillow construction that forms the basis of the present invention is designated generally by the reference number 10. As shown in FIG. 5, the pillow construction comprises in general a securing unit 11 a pillow unit 12 and a cover unit 13. These units will now be described in seriatim fashion.

As can best be seen by reference to FIG. 3, the securing unit 11 comprises an elongated adjustable length strap member 20 whose opposite ends are provided with a pair of cooperating fasteners 21 22 such as a bayonet style clasp arrangement or the like.

Turning now to FIGS. 3 and 5, it can be seen that the pillow unit 12 comprises a pillow member 30 including a generally cylindrical shaped sealed fabric envelope 31 filled with a quantity of displaceable and or deformable particulate material 32 such as buckwheat hulls, foam beads, or the like.

In addition, as shown in FIGS. 3 through 6, the cover unit 13 comprises a generally cylindrical fabric cover member 40 having a pair of circular end panels 41 42 provided with opposed apertures 43 43 disposed adjacent the rear portion of the fabric cover member 40; wherein, the apertures 43 43 are dimensioned to slidably receive the strap member 20.

Furthermore, as can best be appreciated by reference to FIGS. 4 through 6, the front portion of the cover member 40 is provided with an elongated zippered closure 44 that is further provided with an elongated flap panel 45 disposed in an overlying relationship with the zippered closure for both aesthetic and practical reasons as well, since the flap panel 45 will prevent the teeth of the zippered closure 44 from coming into contact with the user's skin and/or hair.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A neck supporting pillow construction comprising a pillow unit including a pillow member containing a quantity of particulate material a cover unit including a fabric cover member adapted to receive the pillow member and having a pair of opposed apertures wherein, the fabric cover member is provided with an elongated zippered closure dimensioned to receive the pillow member, both the pillow member and the cover member have an elongated cylindrical configuration, and the cover member is provided with a pair of circular end panels and wherein, the opposed apertures are formed in the circular end panels; and a securing unit including an elongated strap member dimensioned to be slidably received through said pair of opposed apertures in the cover member.

2. The pillow construction as in claim 1; wherein, the cover member is provided with a flap panel that overlies the zippered closure.

3. The pillow construction as in claim 1; wherein, the opposed apertures are formed proximate the rear portion of the cover member.

4. The pillow construction as in claim 3; wherein, the zippered closure is formed proximate the front portion of the cover member.

* * * * *